Aug. 30, 1966  W. H. NAYLOR ETAL  3,269,336

FOUR-WAY ENTRY PALLET

Filed Nov. 27, 1964

INVENTORS
WILLIAM H. NAYLOR
BY CHARLES F. SMITH

Charles L. Lovercheck
attorney

3,269,336
FOUR-WAY ENTRY PALLET
William H. Naylor, R.D. 1, North East, Pa., and Charles F. Smith, R.D. 1, Ripley, N.Y.
Filed Nov. 27, 1964, Ser. No. 414,150
1 Claim. (Cl. 108—58)

This invention relates to pallets and, more particularly, to a fiberglass pallet.

There has been a problem in the past of providing a strong four way pallet which is solved by the pallet disclosed herein.

The principal object of this invention is to provide a molded fiberglass pallet which is of single unit construction, lightweight, and which will provide rigid support for objects in moving from one place to another or in stacking.

Still another object of the invention is to provide a pallet with a dish shaped top surface, so the objects which are carried thereon will move to the center when vibrated.

Still another object is to provide a pallet having intermediate supports which have rounded corners thereby allowing the forks of the lifting truck to slide off of them and into position between the supports.

Another object of the invention is to provide a pallet which is simple in construction, economical to manufacture, and simple and efficient to use.

Further objects, features, and advantages of this invention will become apparent from a consideration of the following description when taken in connection with the accompanying drawing in which.

Figure 1:
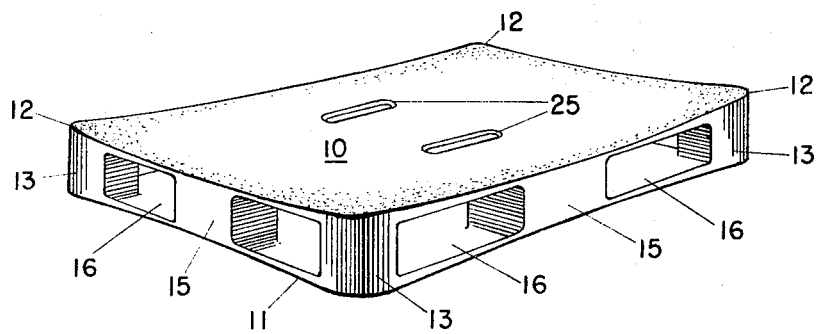
FIG. 1 is a perspective view of the invention.
Figure 2:
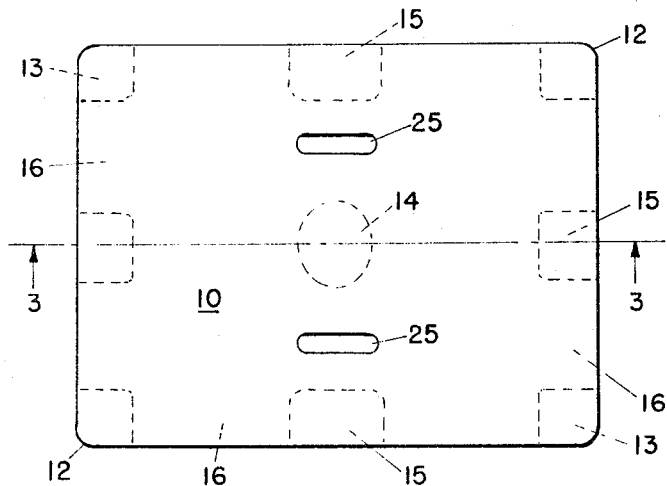
FIG. 2 is a top view of the invention showing the supports.

Now with more particular reference to the drawing, the pallet shown in FIG. 1 may be square or rectangular in shape having a top surface 10 which is slightly dished in the center so that a load will tend to slide toward the center. The bottom surface 11 is also dished in the center and is identical to the top. The top and bottom members have rounded corners 12 which permit the pallets to slide past each other when moved in close proximity. The top member 20 and bottom member 21 are joined together by four corner supports 13 which are founded on their outer edges and square shaped on their inner edges. Evenly spaced between the corner posts are edge supports 15 which will have a round surface facing the center support, and a rounded outer surface to conform to the rounded outer surface of said top and bottom.

The center support 14 will be oval in shape thereby allowing the forks of a lift truck to slide in the proper position when the forks are placed in the rectangular lift openings 16.

Figure 3:
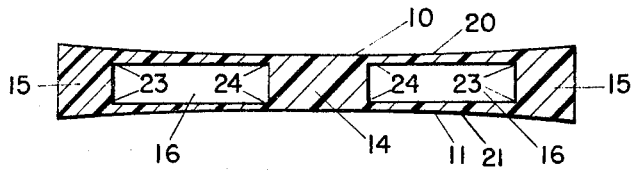
FIG. 3 is a cross sectional view taken on line 3—3 of FIG. 2.

FIG. 3 is a cross sectional view showing the dished top surface 10 and inverted dished bottom surface 11. When the load is placed on the surface, it will have a tendency to move toward the center due to vibrations during movement and stacking, therefore, the load moves to a more stable position.

The top and bottom 20 and 21 are thicker at the outside than at the center and taper from outside at 23 to center at 24, as shown in FIG. 3. It has been discovered that the pallet can be made much more durable and will not be as easily damaged when the top and bottom are made in this manner. This increase in thickness need not be great and the outside of the top and bottom member may be only one-tenth inch thicker than the center to greatly increase the strength thereof.

A hand hole 25 through the top member and bottom member is disposed at each side of the center approximately two-thirds of the distance from the outside edge toward the center. A person may put his fingers through the hand hole 25 to lift the pallet.

The entire pallet, including the top, bottom, and supports, is made of a material having the properties of wear resistance, strength, and durability of fiberglass impregnated resin.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A pallet for use with a fork lift truck comprising a generally rectangular top member and a generally rectangular bottom member spaced from each other,
  said top member and bottom member each having a dished outer surface inclined inward and toward the center,
  spaced supports comprising corner supports, intermediate supports, and a center support, disposed between said top and bottom members and integrally connected thereto,
  said corner supports being disposed at each corner of said pallet,
  said center support being integrally connected to said top and said bottom and being oval shaped in cross section,
  said intermediate supports being integrally connected to said top and said bottom,
  said pallet being made of a material having properties of resiliency and tensile strength of fiberglass impregnated resin, the corners of said top and said bottom being rounded and said corner supports being rounded to conform to said rounded corners of said top and said bottom, said top member and said bottom member both being thicker along the outside edges than at the center, and said top member and said bottom member decreasing in thickness from the outside edge toward the center.

References Cited by the Examiner

UNITED STATES PATENTS

| | | | |
|---|---|---|---|
| 2,229,536 | 1/1941 | Wilkich | 5—345 |
| 2,463,214 | 3/1949 | Stoner | 108—52 |
| 2,493,562 | 1/1950 | Yarman | 108—58 |
| 2,673,052 | 3/1954 | Risch | 248—188.8 |
| 2,991,965 | 7/1961 | Drieborg | 108—58 |
| 3,104,085 | 9/1963 | Skladany | 108—51 X |
| 3,111,689 | 11/1963 | Mulhauser | 5—345 |
| 3,123,020 | 3/1964 | Voissem | 108—51 |
| 3,140,672 | 7/1964 | DeLuca | 108—53 |

FOREIGN PATENTS 25,518   7/1952   Finland.

FRANK B. SHERRY, Primary Examiner.

G. O. FINCH, Assistant Examiner.